(12) United States Patent
Escowitz et al.

(10) Patent No.: US 12,011,854 B2
(45) Date of Patent: Jun. 18, 2024

(54) FIBER COMPOSITES COMPRISING A CIRCUIT, AND METHOD THEREFOR

(71) Applicant: Arris Composites Inc., Berkeley, CA (US)

(72) Inventors: Ethan Escowitz, Berkeley, CA (US);
Riley Reese, Oakland, CA (US);
Andrew Mathews, Berkeley, CA (US);
J. Scott Perkins, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 621 days.

(21) Appl. No.: 17/157,519

(22) Filed: Jan. 25, 2021

(65) Prior Publication Data

US 2021/0229325 A1    Jul. 29, 2021

Related U.S. Application Data

(60) Provisional application No. 62/965,606, filed on Jan. 24, 2020.

(51) Int. Cl.
*B29C 43/18* (2006.01)
*B29K 79/00* (2006.01)
*B29L 31/34* (2006.01)
*H02J 7/00* (2006.01)
*H02J 7/02* (2016.01)
(Continued)

(52) U.S. Cl.
CPC ............ *B29C 43/18* (2013.01); *H02J 7/0042* (2013.01); *H02J 7/02* (2013.01); *H02J 50/005* (2020.01); *H02J 50/10* (2016.02); *B29C 2043/182* (2013.01); *B29K 2079/08* (2013.01); *B29L 2031/34* (2013.01)

(58) Field of Classification Search
CPC ... B29C 70/86; B29C 43/18; B29C 2043/182; B29L 2031/3425
See application file for complete search history.

(56) References Cited

U.S. PATENT DOCUMENTS

| 7,281,318 | B2 * | 10/2007 | Marshall | ............. B29C 35/0272 29/610.1 |
| 2010/0195959 | A1 * | 8/2010 | Meidar | .................. B62D 21/17 385/76 |

(Continued)

FOREIGN PATENT DOCUMENTS

WO    WO-2019124929 A1 *    6/2019    ............. B32B 15/08

OTHER PUBLICATIONS

Neĭman, M. B. et al. "The Thermal Degradation of Some Epoxy Resins." Journal of polymer science 56.164 (1962): 383-389. Web. (Year: 1962).*

*Primary Examiner* — Seyed Masoud Malekzadeh
*Assistant Examiner* — Timothy G Hemingway
(74) *Attorney, Agent, or Firm* — Kaplan Breyer Schwarz, LLP

(57) ABSTRACT

Fiber-composite parts that incorporate a very thin electrical circuit, and a method for making the parts via compression molding, are disclosed. The electrical circuit is encapsulated by a film having a melting point that exceeds the maximum temperature to which the film is exposed during compression molding. The electrical circuit is disposed in a composite ply, in a lay-up of composite plies, and electrical leads are routed through the composite plies so that the lead are accessible in the molded fiber-composite part.

10 Claims, 5 Drawing Sheets

(51) Int. Cl.
*H02J 50/00* (2016.01)
*H02J 50/10* (2016.01)

(56) References Cited

U.S. PATENT DOCUMENTS

| | | | |
|---|---|---|---|
| 2015/0311740 A1* | 10/2015 | Hilario | H02J 7/0042 |
| | | | 320/108 |
| 2019/0344514 A1* | 11/2019 | Wakeham | H05K 5/02 |
| 2020/0114591 A1 | 4/2020 | Reese et al. | |

* cited by examiner

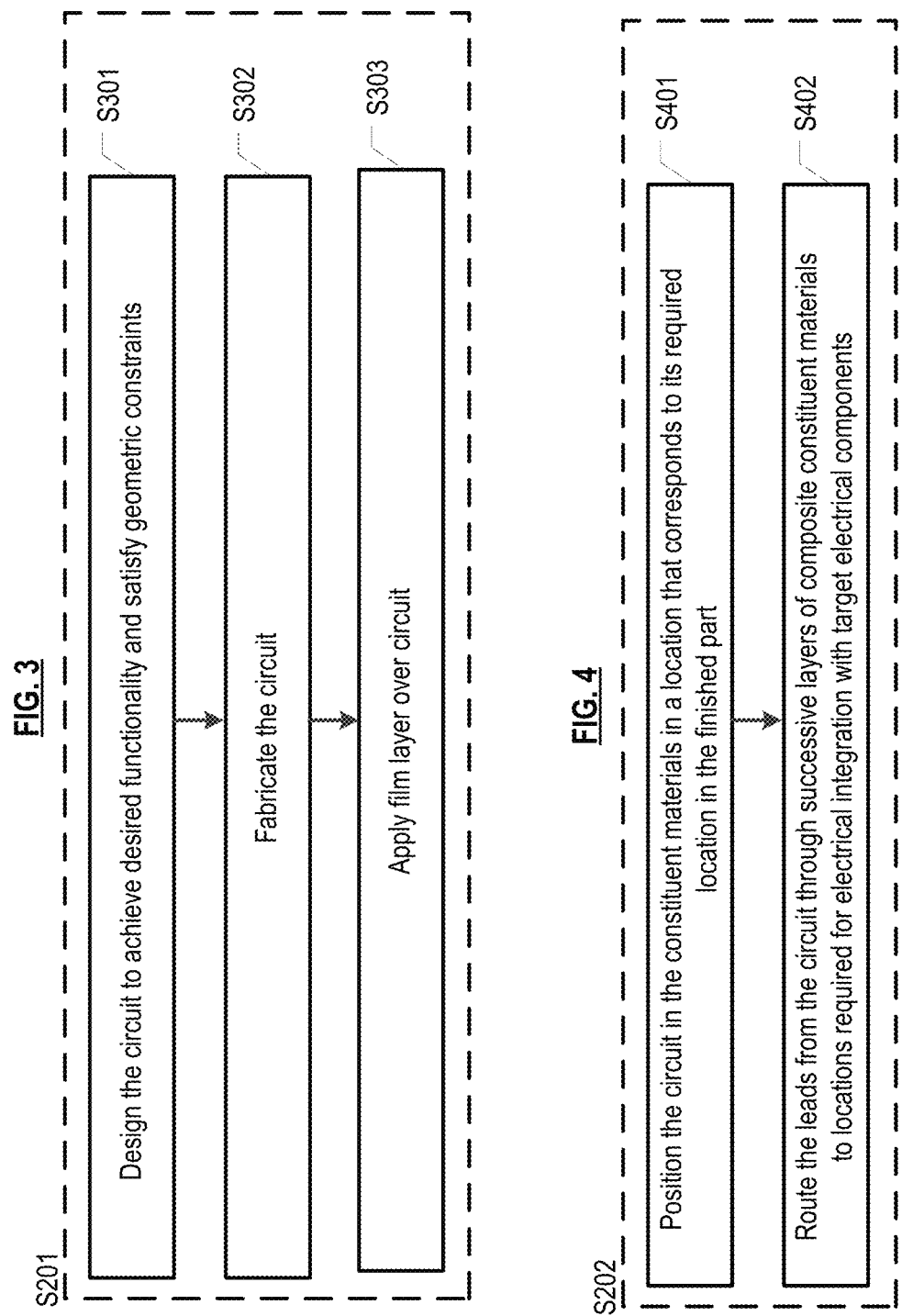

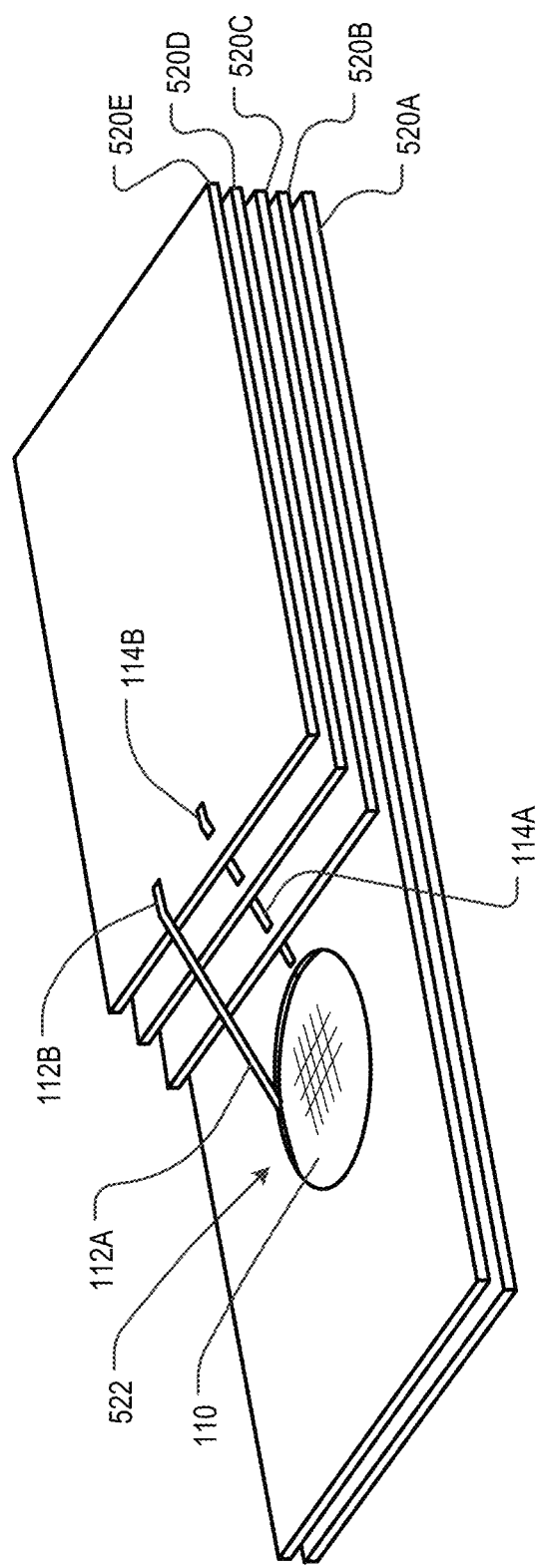
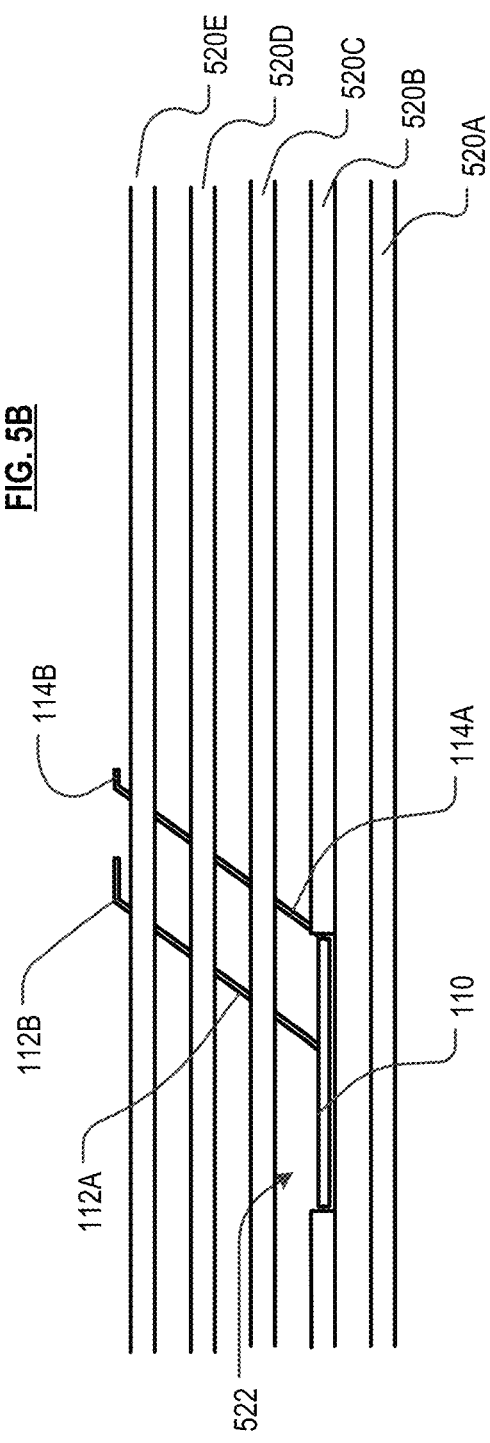

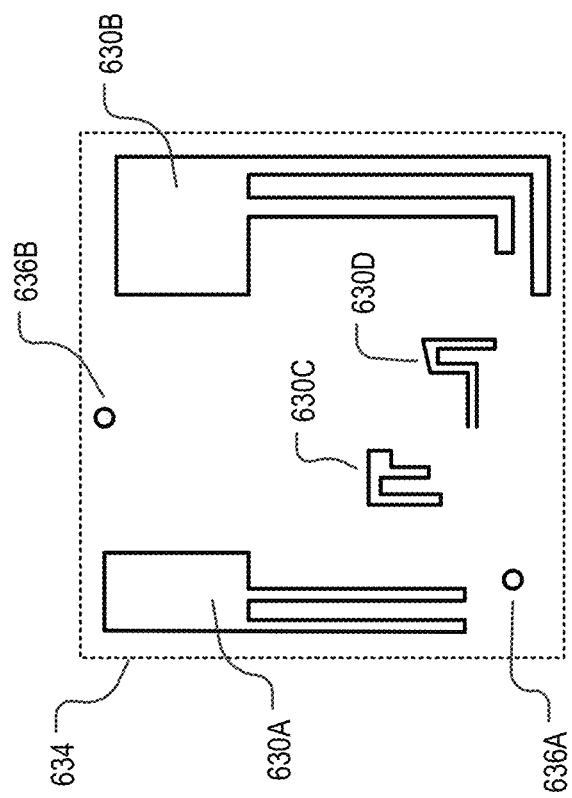
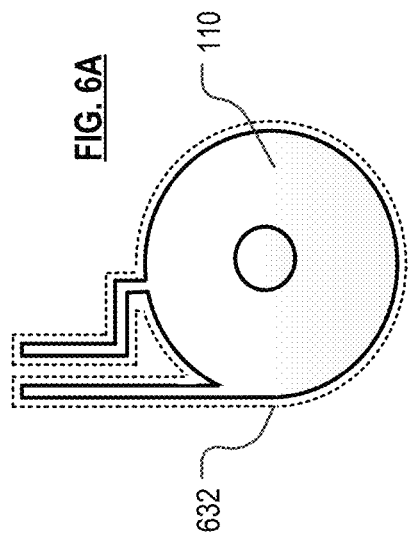

FIBER COMPOSITES COMPRISING A CIRCUIT, AND METHOD THEREFOR

This case claims priority to U.S. Pat. Application Ser. 62/965,606 filed Jan. 24, 2020, and which is incorporated herein.

FIELD OF THE INVENTION

The present invention relates to additive molding of fiber-composite materials.

BACKGROUND

Molded interconnect devices (MID) are growing in popularity. Such devices combine electrical circuitry with a molded part, typically formed via injection molding. The part thus does double duty, serving as a mechanical structure (e.g., a housing, etc.) as well as a substrate for the circuitry.

Typically, the circuitry is a pattern of electrical traces residing on a surface of the molded part. The circuitry may be used, for example, to electrically couple electrical components that are contained within a cavity created by the molded part (such as a fire-alarm casing). MIDs are desirable because they eliminate a need for one or more printed circuit boards (PCB) that might otherwise be associated with the molded part. Consequently, the MID provides reduced parts count and structural simplification, which ultimately equates to reduced manufacturing costs.

SUMMARY

The present invention provides compression-molded fiber-composite parts that incorporate very thin electrical circuits, and methods for making such parts.

In accordance with the present teachings, very thin electrical circuits are designed for integration into parts formed via applicant's compression-molding processing techniques. Rather than simply residing on the surface of part, as is typically the case for the injection-molded MIDs, and certain "in-molded electronics" of the prior art, in some embodiments, the very thin electrical circuits are disposed within the matrix (i.e., solidified resin, which contains fibers) of the part itself.

To enable such integration, the electrical circuits must be capable of withstanding the temperatures involved in the applicants' compression-molding techniques, while also conforming to the thin-walled geometry present in many relevant parts applications. Similar to the manner in which applicant's specialized constituent preforms are organized into assemblages (either as a "layup" or a "preform charge") from which a part is then molded via their compression-molding processes, the thin circuits are placed accordingly into a lay-up, typically composed of composite plies, that are placed in the mold along with the assemblage of fiber-bundle based preforms, and compressed into the final part.

To incorporate very thin circuits in a composite part formed via a compression-molding process, materials selection, circuit geometry, and placement of the circuit with respect to the constituent molding materials in a mold cavity must be considered. More particularly, the electrical conductors of the circuit must remain electrically insulated from one another as well as the fibers in the composite, to the extent the fibers may be electrically conductive, lest electrical shorts occur. This implicates proper material selection; in particular, electrical insulating materials that are capable of withstanding elevated temperatures during compression molding. Moreover, the circuit must be properly located within the finished composite part. This requires that the circuit be appropriately positioned in the constituent molding materials during lay-up in the mold cavity.

Applicant's compression-molding processes enable an unprecedented ability to align fibers within a part, resulting in part performance unachievable via injection molding processes and, for that matter, prior-art compression molding processes. At least a portion of the part formed by applicant's process will include such aligned fibers, the alignment selected to best accommodate anticipated in-use stresses to which the part will be subjected. Embodiments of the invention provide a way to incorporate circuitry into such aligned-fiber parts. Consequently, embodiments of the invention provide parts that may possess numerous performance criteria not achievable by the injection-molded MIDs and other circuitry-enabled composites of the prior art.

In some embodiment, the invention provides a method for integrating, in a compression-molding process, a circuit into a fiber-composite part, wherein the method comprises: fabricating the circuit; covering the circuit with a film having a melting point that exceeds a maximum temperature to which the circuit is exposed during the compression-molding process; forming a lay-up of plies in a mold cavity, each ply comprising fibers and thermoplastic resin; disposing the circuit in an opening formed in at least one of the plies, wherein a relative position of the one ply in the lay-up of plies determines the proximity of the circuit to a surface of the fiber-composite part, and a location of the opening along a length and width of the ply, and the one ply's position in the mold cavity, determines a location of circuit in fiber-composite part; and molding the fiber-composite part via compression molding.

In some embodiment, the invention provides a fiber-composite part comprising: a polymer matrix; a plurality of fibers disposed within the matrix, wherein at least some of the fibers are unidirectionally aligned with one another; an electrical circuit, wherein the electrical circuit is encapsulated within the polymer matrix; and electrical contacts, wherein the electrical contacts are electrically coupled to the electrical circuit, and wherein the electrical contacts extend beyond a surface of the polymer matrix.

BRIEF DESCRIPTION OF THE DRAWINGS

FIG. 3 depicts operations of the method of FIG. 2.

FIG. 4 depicts operations of the method of FIG. 2.

FIG. 5A depicts a perspective view of a circuit positioned in a layup of fiber/resin plies.

FIG. 5B depicts a side view of the layup of FIG. 5A.

FIGS. 6A and 6B depict exemplary circuits, with an overlying film as added in accordance with the present teachings.

DETAILED DESCRIPTION

Figure 1:
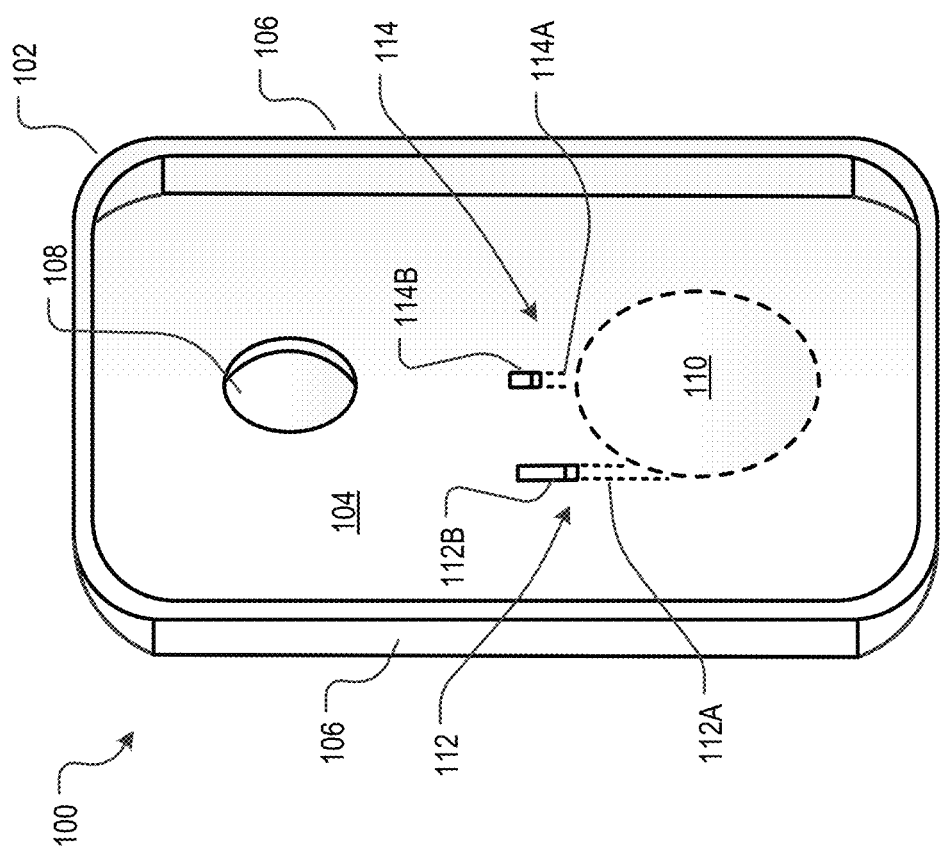
FIG. 1 depicts a circuit integrated into a fiber-composite part in accordance with an illustrative embodiment of the present invention.

The following terms, and their inflected forms, are defined for use in this disclosure and the appended claims as follows:

"Fiber" means an individual strand of material. A fiber has a length that is much greater than its diameter. A fiber may be classified as being "continuous." Continuous fibers have a length that is no less than about 60 percent of the length of a mold feature or part feature where they will ultimately reside. Hence, the descriptor "continuous" pertains to the relationship between the length of a fiber and a length of a region in a mold or part in which the fiber is to be sited. For example, if the long axis of a mold has a length of 100 millimeters, fibers having a length of about 60 millimeters or more would be considered "continuous fibers" for that mold. A fiber having a length of 20 millimeters, if intended to reside along the same long axis of the mold, would not be "continuous." Such fibers are referred to herein as "short fibers." Short fiber, as the term is used herein, is distinct from "chopped fiber," as that term is typically used in the art. In the context of the present disclosure, all fibers, regardless of length, will be sourced from preforms. And substantially all of the (typically thousands of) fibers in a preform are unidirectionally aligned. As such, all fibers, regardless of length and regardless of characterization as "continuous" or otherwise, will have a defined orientation in the preform layup or preform charge in the mold and in the final part. Chopped fiber, as that term is used in the art, refers to fibers that, in addition to being short, have a random orientation in a mold and the final part.

"Fiber bundle" means plural (typically multiples of one thousand) unidirectionally aligned fibers.

"Tow" means a bundle of unidirectional fibers, ("fiber bundle" and "tow" are used interchangeably herein unless otherwise specified). Tows are typically available with fibers numbering in the thousands: a 1K tow (1000 fibers), 4K tow (4000 fibers), 8K tow (8000 fibers), etc.

"Prepreg" means fibers, in any form (e.g., tow, woven fabric, tape, etc.), which are impregnated with resin.

"Towpreg" or "Prepreg Tow" means a fiber bundle (i.e., a tow) that is impregnated with resin.

"Preform" means a segment of plural, unidirectionally aligned fibers. The segment is cut to a specific length, and, in many cases, will be shaped (e.g., bent, twisted, etc.) to a specific form, as appropriate for the specific part being molded. The fibers in each preform typically number in multiples of a thousand (e.g., 1k, 10k, 24k, etc.). The fibers align with the major axis of their host preform. Preforms are usually sourced from towpreg (i.e., the towpreg is sectioned to a desired length), but can also be from another source of plural unidirectionally aligned fibers (e.g., from a resin impregnation process, etc.). The cross section of the preform, and the fiber bundle from which it is sourced, typically has an aspect ratio (width-to-thickness) of between about 0.25 to about 6. Nearly all fibers in a given preform have the same length (i.e., the length of the preform) and, as previously noted, are unidirectionally aligned. The modifier "fiber-bundle-based" or "aligned fiber" is often pre-pended, herein, to the word "preform" to emphasize the nature of applicant's preforms and to distinguish them from prior-art preforms, which are typically in the form of segments of tape or in the form of a shape cut from sheets of fiber. Applicant's use of the term "preform" explicitly excludes any size of shaped pieces of: (i) tape (typically having an aspect ratio, as defined above, of between about 10 to about 30), (ii) sheets of fiber, and (iii) laminates. Regardless of their ultimate shape/configuration, these prior-art versions of preforms do not provide an ability to control fiber alignment in a part in the manner of applicant's fiber-bundle-based preforms.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of (fiber-bundle-based/aligned fiber) preforms or hybrid preforms that are at least loosely bound together ("tacked") so as to maintain their position relative to one another. A preform charge may comprise a mixture of hybrid preforms and preforms, with no limitation on the minimum or maximum number of either type. Preform charges can contain a minor amount of fiber in form factors other than fiber bundles, and can contain various inserts, passive or active. As compared to a final part, in which fibers/resin are fully consolidated, in a preform charge, the hybrid/preforms are only partially consolidated (lacking sufficient pressure and possibly even sufficient temperature for full consolidation). By way of example, whereas a compression-molding process (the typical destination for a preform charge in accordance with the present teachings) is typically conducted at about 500-3000 psi, the downward pressure applied to the preforms to create a preform charge in accordance with the present teachings is typically in the range of about 10 psi to about 100 psi. Thus, voids remain in a preform charge, and, as such, the preform charge cannot be used as a finished part.

A "Feature" of a mold cavity (or molded part) is a relatively small region of a mold cavity (or molded part) that has a form/shape that varies from that of the mold cavity (or molded part) at large.

"Compatible" means, when used to refer to two different resin materials, that the two resins will mix and bond with one another.

"Stiffness" means resistance to bending, as measured by Young's modulus.

"Tensile strength" means the maximum stress that a material can withstand while it is being stretched/pulled before "necking" or otherwise failing (in the case of brittle materials).

"About" or "Substantially" means+/−20% with respect to a stated figure or nominal value.

FIG. 1 depicts electronics-embedded casing 100 in accordance with an illustrative embodiment of the present invention. Electronics-embedded casing 100 includes fiber-composite casing 102, which in the illustrative embodiment is a casing for a cellular telephone, and wireless charging coil 110.

Fiber-composite casing 102 includes flat planar cover 104 and wall 106 situated at the periphery of cover 104. Fiber-composite casing 102 is an example of a "rib-and-sheet" part, which may be fabricated, for example, via the methods described in US 2020/0114591, which is incorporated herein by reference. Since it is now conventional for cellular phones to incorporate a camera, casing 102 includes opening 108 to enable the internal camera(s) to optically interface with the external environment. Wireless charging coil 110 is embedded in flat planar cover 104.

Wireless charging coil 110 forms a part of an inductive wireless charging system, well known in the art, for powering other circuitry or devices associated with the cell phone, not depicted. When a secondary coil, such as coil 110, is sufficiently close to a primary drive coil (not depicted), a current will be generated in coil 110 in known fashion. Coil 110 comprises copper wire or a "trace" of electrically conductive material. In a typical embodiment, the wire/trace includes a number of turns (e.g., about 20 to about 50 turns) to form the coil. As described later in this specification, wireless charging coil 110 (including any insulating/substrate layers) has a thickness that is in the range of about 0.1 to 1.0 millimeters (mm), and a diameter that is in the range of about 25 to 75 mm.

In the illustrative embodiment, electrically conductive leads 112A and 114A extend from charging coil 110 and pass through a portion of the thickness of cover 104 emerging from the inner surface thereof as, or otherwise coupled to, respective electrical contacts 112B and 114B. These electrical contacts electrically couple to relevant circuitry (not depicted) that is disposed, for example, within a cavity defined by casing 102 and another casing, not depicted. In some other embodiments, the circuitry being powered can be: (i) embedded elsewhere in casing 102, (ii) embedded in other casing/walls that, along with casing 102, provide the housing for the device, (iii) disposed on internal or external surfaces of the casing(s), or (iv) located external to the casings/walls.

Figure 2:
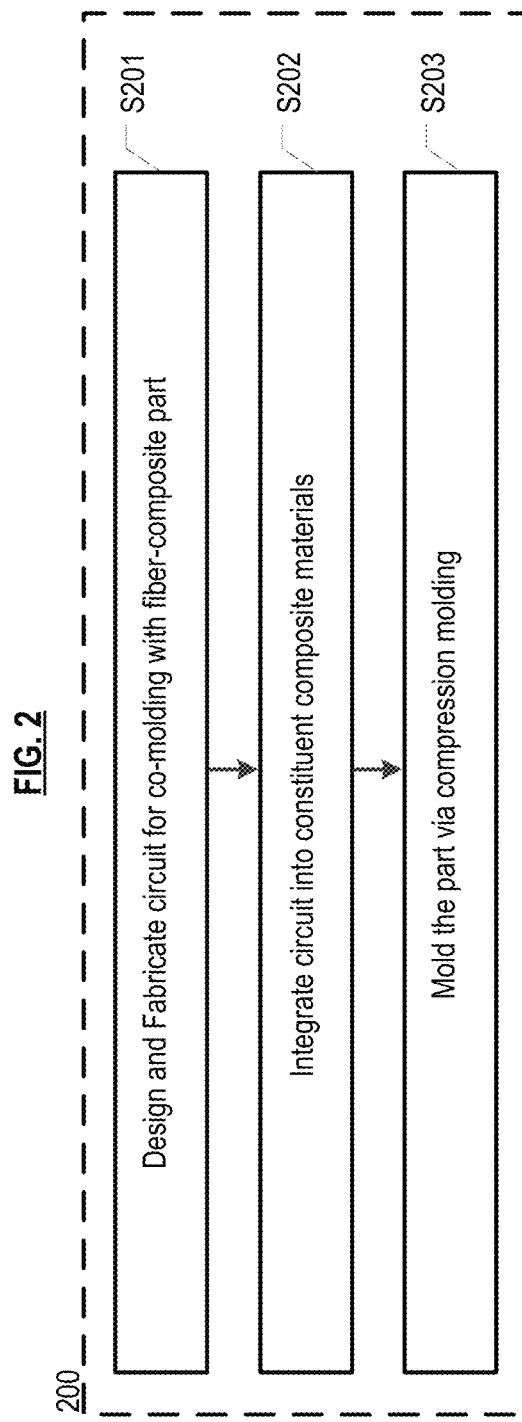
FIG. 2 depicts a method for fabricating a fiber-composite part including a circuit in accordance with the present teachings.

FIG. 2 depicts method 200 for fabricating fiber-composite parts including electrical circuits in accordance with the present teachings. FIGS. 3 and 4 depict further details pertaining to the operations recited in method 200.

Per operation S201 of method 200, a circuit, such as wireless charging coil 110, is designed and fabricated. FIG. 3 depicts a method for implementing operation S201. In accordance with suboperation S301, the electrical design of the circuit is implemented in accordance electrical-engineering guidelines to achieve a desired functionality. For example, such functionality may include, but is not limited to, wireless charging as in the illustrative embodiment of FIG. 1, radio-frequency signal transmission and/or receiving, and/or current transfer between components in the final assembly (e.g., processor chips, graphics chips, camera, etc.). The electrical design of wireless charging coil 110 or other circuits is not described herein so as to maintain focus on elements that are germane to the present invention.

Since the circuit is to be integrated into a fiber-composite part, certain geometric constraints related to integration must be considered. And such geometric constraints may impact the circuit design. For example, to ensure that the circuit is properly positioned in the molded part, in some embodiments, the lay-up of composite plies is used to register the circuit in a desired location. The thickness of an individual ply is typically in the range of about 0.1 to 0.3 mm. In the illustrative embodiment, an opening is formed in one of the composite plies, at a location corresponding to the desired location of the circuit in the final part. Ideally, the thickness of the circuit is such that it will fit within the confines of the thickness of one ply. In this manner, aspects of the integration may impact the circuit design.

With the electrical and geometric design of the circuit established, the circuit is fabricated per operation S302. Fabrication of the circuit can be achieved through a number of conventional processes, including, without limitation, modified semiconductor or screen-printing processes. Once a circuit has been fabricated, it is often adhered to a thin-film substrate, such as a ferrite film, particularly if the circuit is a wireless charging coil. Among other functions, the substrate protects the circuit during subsequent handling and processing operations.

It is notable that in applicant's process, fabrication of the circuit is independent of molding operations, which follow circuit fabrication. This is distinguished from the fabrication of many of the prior-art MID devices, wherein the circuit is fabricated as part of the molding operation, such as by laser sintering.

After the circuit is fabricated, a film layer is placed over the circuit (e.g., charging coil 110) in accordance with operation S303. The film layer provides several functions. First, the film layer smoothes/flattens the surface of the circuit. In the case of wireless charging coil 110, for example, in the absence of the film layer, the surface profile of the circuit would rise and fall due to the gap between successive turns of the coil. Such a surface profile could result in sink marks (dimples) at the surface of the composite part, particularly if the circuit is disposed near to that surface. It is desirable for a wireless charging coil to be close to surface of the part to improve the efficiency of inductive coupling. Consequently, the film layer enables the circuit to be positioned relatively closer to the surface of the composite part (while avoiding sink marks) than would otherwise be possible. Secondly, during the high pressures experienced during compression molding (to consolidate the constituent composite materials), it is possible that fibers could penetrate the electrical insulator surrounding the conductor that forms the coil. If the fibers are electrically conductive, this could cause an electrical short, resulting in coil malfunction.

Selection of the film layer is determined, at least in part, by the parameters of the compression-molding process. Specifically, the melt temperature of the film layer polymer must be above that of the thermoplastic polymer used as the resin for the composite. This ensures that the film layer will not melt.

Depending on the initial form of the film, it can be laminated, sprayed, or otherwise adhered to one or both sides of the circuit. In some embodiments, the secondary insulator is a polyimide film, such as Kapton® tape, available from E.I. du Pont de Nemours and Company. This material is suitable for temperatures as high as 260° C. A silicone adhesive is typically used with Kapton® tape. Kapton® tape is conventionally available in thicknesses of 1.0 mil (0.0254 mm), 2.0 mil, and 5.0 mil thicknesses, with the silicon adhesive adding another 1.5 mil of thickness. Regardless of the material and application method, the circuit—such as charging coil 110—becomes encased within a thin film layer. Assuming the circuit is disposed on a substrate, the film may be deposited only over the surface of the circuit. FIG. 6A depicts film layer 632 disposed on wireless charging coil 110.

The shape of the film layer can vary beyond the bounds of a particular circuit. For example, the film can have features outside of the circuit footprint for numerous functionalities, such as material handling or mold registration. FIG. 6B depicts a plurality of circuits 630A through 630D, all encapsulated by a single film layer 634. These circuits may be used in a wireless phone. For example, circuits 630A and 630B represent two different antennas on either side, and circuits 630C and 630D are current paths for the camera and microphone interfaces. Openings 636A and 636B receive alignment fiducials, etc., that extend from a ply layer, thereby ensuring the proper positioning of circuitry into the lay-up of plies.

Conventionally, the electrically conductive material (e.g., copper wire, electrically conductive trace, etc.) that is spiraled to form charging coil 110 is encased in an electrical insulator. During experimentation to develop a method for integrating charging coil 110 into a fiber-composite part, the applicant covered the complete spiraled electrical conductor coil with the above-mentioned film layer. It was found that although the film layer maintained its integrity, the electrical insulator that surrounded the wire/conductive trace did in fact degrade. Once this occurred, the function of the charging coil was lost as a result of current shorting in the circuit itself due to the loss of electrical insulation. Consequently, it is important to specify that the electrical insulator that surrounds the circuit's electrical conductor is able to withstand the processing temperatures expected during the compression molding process.

Continuing now with operation S202 of method 200 (FIG. 2), the circuit is integrated into the constituent composite materials, which in the illustrative embodiment, is the lay-up of composite plies. In the case of a cell phone casing, such as depicted in FIG. 1, this operation involves forming a layup of fiber-composite plies for forming planar cover 104, as well as an assemblage of fiber-bundle-based preforms (either as a preform layup or preform charge), for forming the sidewall 106. Casing 102 is an example of a "rib-and-sheet" part, which may be fabricated by the methods disclosed in US 2020/0114591, as adapted to insert a circuit, as described herein. The integration operation principally focuses on two criteria: (i) locating the insert for proper functioning in the molded part, and (ii) appropriately situating the circuit leads for electrical integration with the final assembly.

As discussed in conjunction with suboperation S301 of operation S201, the design of the circuit considers geometrical constraints, such as the ability of the composite plies to accommodate the circuit. This, for example, was a basis for setting the thickness and diameter of wireless charging coil 110. A lay-up of composite plies is depicted, for example, in FIGS. 5A and 5B. It is notable that in these figures, the spacing between plies is exaggerated for clarity. As previously noted, the plies are typically used to form flat planar regions of a part, such as cover 104 of casing 102. Opening 522, which is suitably dimensioned to accommodate the diameter and thickness of charging coil 110, is formed in ply 520B. As necessary, an opening is formed in an overlying or underlying ply to accommodate the thickness of the circuit, to the extent it exceeds that of a single ply. The depth of the circuit in the final part is dictated by the relative height of the ply in which the circuit resides in the lay-up of plies. If the circuit is disposed in a ply that is relatively lower in the lay-up, such as ply 520B, then, for a part such as casing 102, the circuit will be situated relatively closer to the exterior (outward-facing) surface of the casing. The position of opening 522 along the length and width of the ply dictates the location of the circuit along the length and width of the part. As long as the layup of plies is appropriately registered/positioned within the mold cavity, the aforementioned techniques are suitable for definitively and repeatedly establishing the location of circuit in the final part.

Referring now to FIG. 4, per suboperation S401 of operation S202, the circuit is positioned in the constituent materials—typically composite plies— at the appropriate location. In the context of the illustrative embodiment, this means placing wireless charging coil in opening 522.

As per suboperation S402 of operation S202, leads from the embedded circuitry are routed through the layers of composite constituent materials, as appropriate, to the requisite locations for electrical coupling with target circuitry. Assuming that the leads are meant to electrically couple to later-added electrical devices, the leads must remain accessible after compression molding operations.

Referring again to FIGS. 5A and 5B, leads 112A and 114A are routed through successive layers of composite plies 520C through 520E, extending beyond the surface of uppermost ply 520E, and terminating in contacts 112B and 114B. Routing of leads can therefore entail penetrating plies of material, circumventing preforms, and the like.

Once routed through the layup, the position of the leads is maintained through the molding process in a manner similar to the circuit itself (i.e., via mold registration features, etc.), thereby making them accessible, as necessary, on a surface of the molded part. For example, FIG. 1 depicts contacts 112B and 114B extending beyond the inside surface of cover 104. As required, each lead on a resultant part is joined, such as by soldering, to the necessary components via post-processing steps.

In the lateral plane normal to the axis of compression (i.e., parallel to the composite plies of FIGS. 5A and 5B), the thin circuits used by applicant are significantly stiffer than their thicker counterparts. By virtue of this geometric stiffness, the thin profile of the circuitry inhibits in-plane deformation, thus maintaining the circuit layout under pressure.

It is to be understood that the disclosure describes a few embodiments and that many variations of the invention can easily be devised by those skilled in the art after reading this disclosure and that the scope of the present invention is to be determined by the following claims.

What is claimed:

1. A method for forming, via compression molding, a fiber-composite part that includes a circuit, the method comprising:
    fabricating the circuit;
    covering the circuit with a polyimide tape having a melting point that exceeds a maximum temperature to which the circuit is exposed during the compression-molding;
    forming a lay-up of plies in a mold cavity, each ply comprising fibers and thermoplastic resin;
    positioning the circuit in the lay-up of plies, ensuring that the circuit is positioned in a desired location in the fiber-composite part by:
    (a) forming an opening in at least one ply of the lay-up thereof, wherein a position of the opening in the at least one ply corresponds to the desired location of the circuit in the fiber-composite part, the opening thereby registering the circuit to a desired position in the fiber-composite part being molded, and
    (b) disposing the circuit in the opening; and
    molding the fiber-composite part via the compression molding, wherein due to being positioned in the layup of plies, the circuit is disposed within the matrix of the fiber-composite part.

2. The method of claim 1 wherein disposing the circuit in an opening comprises routing electrical leads through at least some of the plies in the lay-up thereof to a first and second location.

3. The method of claim 2 wherein disposing the circuit in the opening comprises routing the electrical leads to extend beyond an upper surface of an uppermost ply in the lay-up of plies.

4. The method of claim 1 wherein the circuit comprises a wireless charging coil.

5. The method of claim 1 wherein the fiber-composite part is a casing for a cell phone, the casing having an exterior surface and an interior surface.

6. The method of claim 5 wherein forming the opening comprises forming the opening in a ply that is proximal to a bottommost ply of the lay-up thereof, wherein the bottommost ply forms a portion of the exterior surface of the casing.

7. The method of claim 5 wherein the circuit comprises a wireless charging coil.

8. The method of claim 6 wherein the circuit comprises a wireless charging coil.

9. The method of claim 1, wherein the fabricating the circuit comprises designing the circuit to have a thickness that is substantially no greater than a thickness of a single ply of the lay-up of plies.

10. The method of claim 1 wherein the circuit comprises an antenna.

\* \* \* \* \*